United States Patent
Plote

(10) Patent No.: US 6,722,120 B2
(45) Date of Patent: Apr. 20, 2004

(54) METHOD AND DEVICE FOR THE CONTROL OF AN EXHAUST GAS TREATMENT SYSTEM

(75) Inventor: Holger Plote, Fellbach Oeffingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/181,073

(22) PCT Filed: Oct. 20, 2001

(86) PCT No.: PCT/DE01/04004

§ 371 (c)(1),
(2), (4) Date: Oct. 28, 2002

(87) PCT Pub. No.: WO02/38934

PCT Pub. Date: May 16, 2002

(65) Prior Publication Data

US 2003/0106303 A1 Jun. 12, 2003

(30) Foreign Application Priority Data

Nov. 11, 2000 (DE) .......................................... 100 56 035

(51) Int. Cl.$^7$ ............................................... F01N 3/00
(52) U.S. Cl. .............................. 60/276; 60/274; 60/295; 60/297; 60/311
(58) Field of Search .......................... 60/274, 276, 285, 60/286, 295, 297, 303, 311

(56) References Cited

U.S. PATENT DOCUMENTS

| | | | | |
|---|---|---|---|---|
| 5,154,055 A | * | 10/1992 | Nakane et al. ................. | 60/276 |
| 5,533,332 A | * | 7/1996 | Uchikawa ..................... | 60/274 |
| 5,771,685 A | | 6/1998 | Hepburn | |
| 5,848,528 A | * | 12/1998 | Liu .............................. | 60/274 |
| 6,446,429 B2 | * | 9/2002 | Kobayashi et al. ............ | 60/285 |
| 6,470,674 B1 | * | 10/2002 | Yamaguchi et al. ........... | 60/277 |

FOREIGN PATENT DOCUMENTS

| | | |
|---|---|---|
| DE | 197 46 855 | 4/1999 |
| DE | 199 06 287 | 8/2000 |
| EP | 0 733 787 | 9/1996 |
| FR | 2 774 421 | 8/1999 |
| WO | WO 02/086301 A1 * 10/2002 | ................. 60/295 |

* cited by examiner

Primary Examiner—Binh Tran
(74) Attorney, Agent, or Firm—Kenyon & Kenyon

(57) ABSTRACT

A method and a device are described for controlling an exhaust gas aftertreatment system, in particular of an internal combustion engine. A special operation is intermittently carried out. The control and/or monitoring of the special operation is carried out as a function of a first quantity (O1) which characterizes the oxygen concentration in the exhaust gas upstream from the exhaust gas aftertreatment system, and a second quantity (O2) which characterizes the oxygen concentration in the exhaust gas downstream from the exhaust gas aftertreatment system.

21 Claims, 2 Drawing Sheets

METHOD AND DEVICE FOR THE CONTROL OF AN EXHAUST GAS TREATMENT SYSTEM

FIELD OF THE INVENTION

The present invention relates to a method and a device for controlling an exhaust gas aftertreatment system of an internal combustion engine.

BACKGROUND INFORMATION

A method and a device for controlling an exhaust gas aftertreatment system of an internal combustion engine are described in, for example, German Patent Application No. 199 06 287, in which an exhaust gas aftertreatment system includes a particle filter used, for example, in direct injection internal combustion engines.

Particle filters may become loaded with particles, and regeneration may be performed when a critical amount of particles is exceeded. In this regard, it may be problematic to detect the start and end of the regeneration, as well as to judge whether the particles have been completely regenerated, i.e., oxidized. The differential pressure across the filter may be detected as an output quantity for determining the loading. During regeneration, the resistance of the filter against the medium flowing through decreases, until the value for the empty filter is again achieved, after the reaction of the particles is complete.

The accumulation of ash in the filter may result in a continuous rise in the differential pressure over the operating life of the filter, even in a completely regenerated filter. The additional ash, which may be deposited, may be estimated via fuel consumption and correspondingly considered. Oil ash, which may result from oil consumption in the engine, may not be readily detected. Consequently, increased flow resistance, and thus a rise in the differential pressure, may occur in the completely regenerated filter. As a result, the subsequent regeneration may be initiated too early and/or too often.

SUMMARY OF THE INVENTION

By evaluating a first quantity characterizing the oxygen concentration in the exhaust gas upstream from the exhaust gas aftertreatment system and a second quantity characterizing the oxygen concentration in the exhaust gas downstream from the exhaust gas aftertreatment system, and by controlling the regeneration as a function of these quantities, the regeneration may be more precisely controlled.

Two sensors may detect the oxygen concentration, one upstream and the other downstream from the particle filter. The oxygen concentration during regeneration may be lower downstream than upstream from the particle filter, due to oxidation during regeneration.

When regeneration ends, both quantities assume approximately the same value, presupposing that no additional particles are reacted, i.e., oxidized, and that the only particles yet to be reacted are those which have just been emitted from the internal combustion engine. By evaluating both of these signals, the regeneration may be easily and accurately detected. The values may be approximately equal when the difference between the two values corresponds to standard measurement accuracy.

It is believed to be advantageous if the exhaust gas temperature is checked to determine whether it exceeds a specific threshold value, since, only in this case, may oxidation occur, identical oxygen concentrations upstream and downstream from the filter indicating that oxidation has ended.

It is also believed to be advantageous if a differential pressure signal indicating an empty filter is adapted for the detected end of the regeneration. This may permit a significantly more precise control of the start of regeneration.

DETAILED DESCRIPTION

Figure 1:
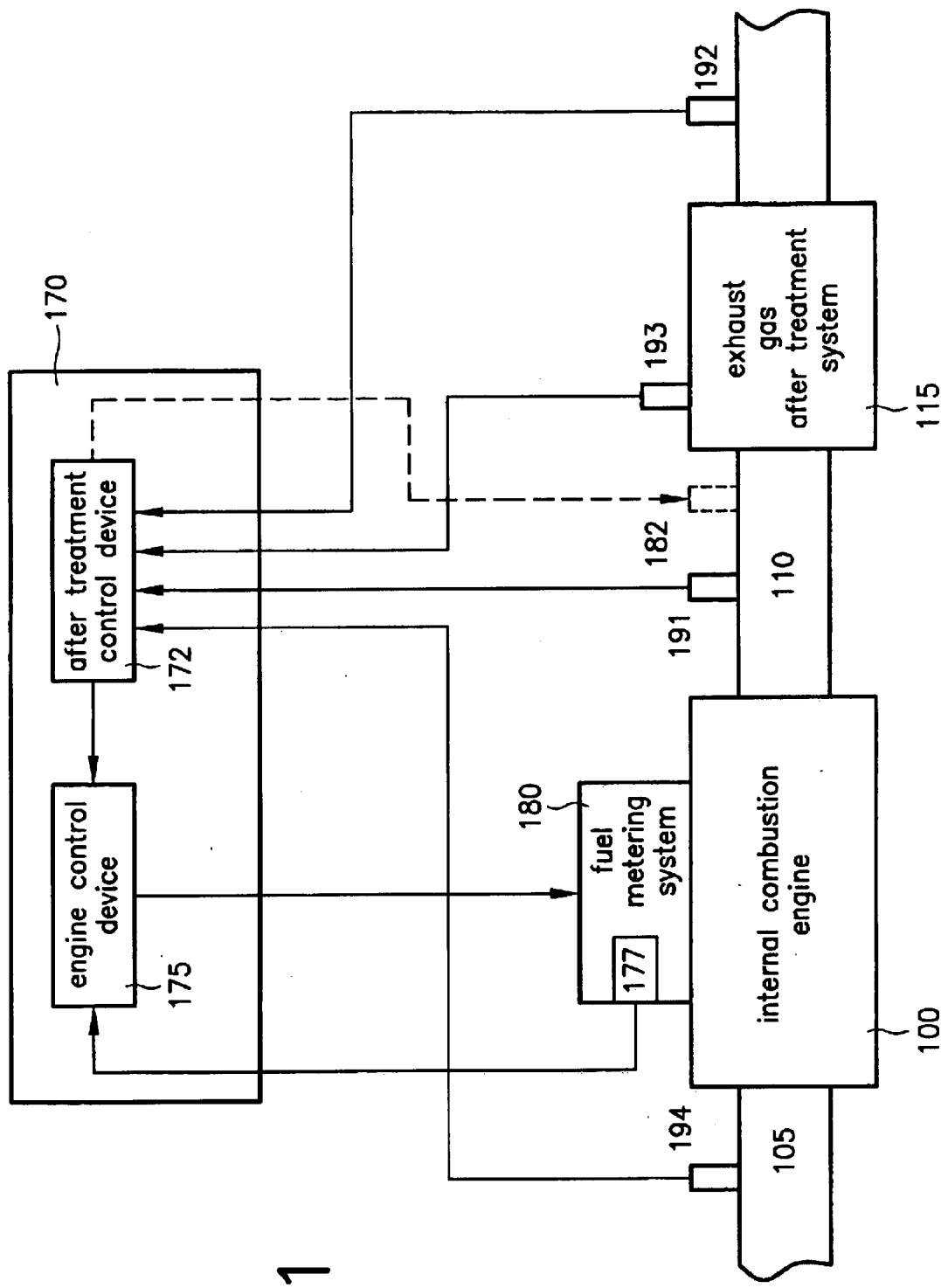
FIG. 1 is a block diagram of an exemplary control according to the present invention.

FIG. 1 illustrates elements of an exemplary exhaust gas aftertreatment system of an internal combustion engine 100 according to the present invention. Fresh air line 105 supplies fresh air to the internal combustion engine 100. The exhaust gas from internal combustion engine 100 is discharged to the environment through an exhaust gas line 110. An exhaust gas aftertreatment system 115 is situated in the exhaust gas line. The exhaust gas aftertreatment system may be a catalyst and/or a particle filter. In addition, a plurality of catalysts for different contaminants, or combinations of at least one catalyst and one particle filter may be provided.

Furthermore, a control device 170 includes at least one engine control device 175 and one exhaust gas aftertreatment control device 172. Engine control device 175 sends control signals to a fuel metering system 180. Exhaust gas aftertreatment control device 172 sends signals to engine control device 175 and, in one exemplary embodiment according to the present invention, to an actuating element 182 situated in the exhaust gas line upstream from the exhaust gas aftertreatment system or in the exhaust gas aftertreatment system.

In addition, various sensors are provided, which supply signals to the exhaust gas aftertreatment control device and the engine control device. Thus, at least one first sensor 194 delivers signals characterizing the state of the air supplied to the internal combustion engine. A second sensor 177 delivers signals characterizing the state of fuel metering system 180. At least one third sensor 191 delivers signals characterizing the state of the exhaust gas upstream from the exhaust gas aftertreatment system. At least one fourth sensor 193 delivers signals characterizing the state of exhaust gas aftertreatment system 115. In addition, at least one sensor 192 delivers signals characterizing the state of the exhaust gas downstream from the exhaust gas aftertreatment system. Sensors may be used to detect the temperature values and/or pressure values. Furthermore, sensors may be used to characterize the chemical composition of the exhaust gas and/or fresh air. These sensors may include, for example, lambda sensors, NOx sensors, or HC sensors.

First sensor 194, third sensor 191, fourth sensor 193, and fifth sensor 192 may send output signals to exhaust gas aftertreatment control device 172, and second sensor 177 may send output signals to engine control device 175. Additional sensors (not shown) may generate a signal characterizing the driver's intent, or other environmental or engine operating states.

The engine control device and the exhaust gas aftertreatment control device may form a structural entity. Alternatively, the engine control device and the exhaust gas aftertreatment control device may be two control devices, spatially separated from one another.

An exemplary method according to the present invention is described below, which may be used, for example, in conjunction with a particle filter of a direct injection internal combustion engine. However, the exemplary method according to the present invention is not limited to this application. It may be used, for example, in other internal combustion engines having an exhaust gas aftertreatment system. For example, the exemplary method according to the present invention may be used in exhaust gas aftertreatment systems having a combined catalyst and particle filter. Furthermore, the exemplary method according to the present invention may be used in systems equipped only with a catalyst.

Based on the sensor signals, engine control 175 calculates control signals to be sent to fuel metering system 180. The fuel metering system then meters the corresponding amount of fuel to internal combustion engine 100. Particles may be formed in the exhaust gas during combustion. The particle filter in exhaust gas aftertreatment system 115 absorbs these particles. Corresponding amounts of particles accumulate in particle filter 115 during operation, which may result in impaired functioning of the particle filter and/or the internal combustion engine. For this reason, a regeneration process is initiated at specific intervals or when the particle filter has reached a specific load state. This regeneration may also be described as a special operation.

The load state may be detected, for example, based on various sensor signals. Thus, the differential pressure between the inlet and the outlet of particle filter 115 may be evaluated and the load state may be determined based on various temperature values and/or pressure values. In addition, other quantities may be used for calculating or simulating the load state. One method is described, for example, in German Patent Application No. 199 06 287.

When the exhaust gas aftertreatment control device detects that the particle filter has reached a specific load state, regeneration is initialized. Various options are available for regenerating the particle filter. For one, certain substances may be supplied to the exhaust gas via actuating element 182, which then causes a corresponding reaction in exhaust gas aftertreatment system 115. These additionally metered substances may cause, for example, a temperature increase and/or oxidation of particles in the particle filter. Thus, for example, fuel substances and/or oxidation agents may be supplied via actuating element 182.

In one exemplary embodiment according to the present invention, an appropriate signal may be transmitted to engine control device 175 for performing a post-injection. Using post-injection, hydrocarbons may be introduced into the exhaust gas in a targeted manner, the hydrocarbons contributing to the regeneration of exhaust gas aftertreatment system 115 via an increase in temperature.

The load state may be determined based on various quantities. The different states may be detected by a comparison to a threshold value, and the regeneration may be initiated depending on the detected load state.

In another exemplary system for exhaust gas aftertreatment according to the present invention, sensors are provided for detecting the differential pressure between the inlet and the outlet of the particle filter, and sensors are provided for detecting the oxygen concentration upstream and downstream from the particle filter. Furthermore, in still another exemplary embodiment according to the present invention, a temperature sensor measures the exhaust gas temperature upstream, in or downstream from the particle filter.

In normal driving mode, the lambda probes or one of the lambda probes may be used for monitoring and/or controlling combustion in the engine. If a corresponding loading of the particle filter is detected, a special operation is performed, i.e., the particle filter is regenerated. The oxygen concentrations upstream and downstream from the filter are compared during regeneration. If the exhaust gas temperature, as detected, for example, by a sensor, exceeds a specific value, the particles are oxidized, resulting in a marked decrease in the oxygen concentration downstream from the filter. If the oxygen concentration downstream from the filter again increases, this indicates that the regeneration has ended. At a sufficiently high exhaust gas temperature during regeneration, the complete regeneration of the particle filter may be detected when the oxygen concentrations upstream and downstream from the particle filter are approximately the same.

An exemplary method according to the present invention is not limited to the particle filter, and may be used in other exhaust gas aftertreatment systems, such as an oxidation catalyst and/or a continuously operating particle filter system.

Figure 2:
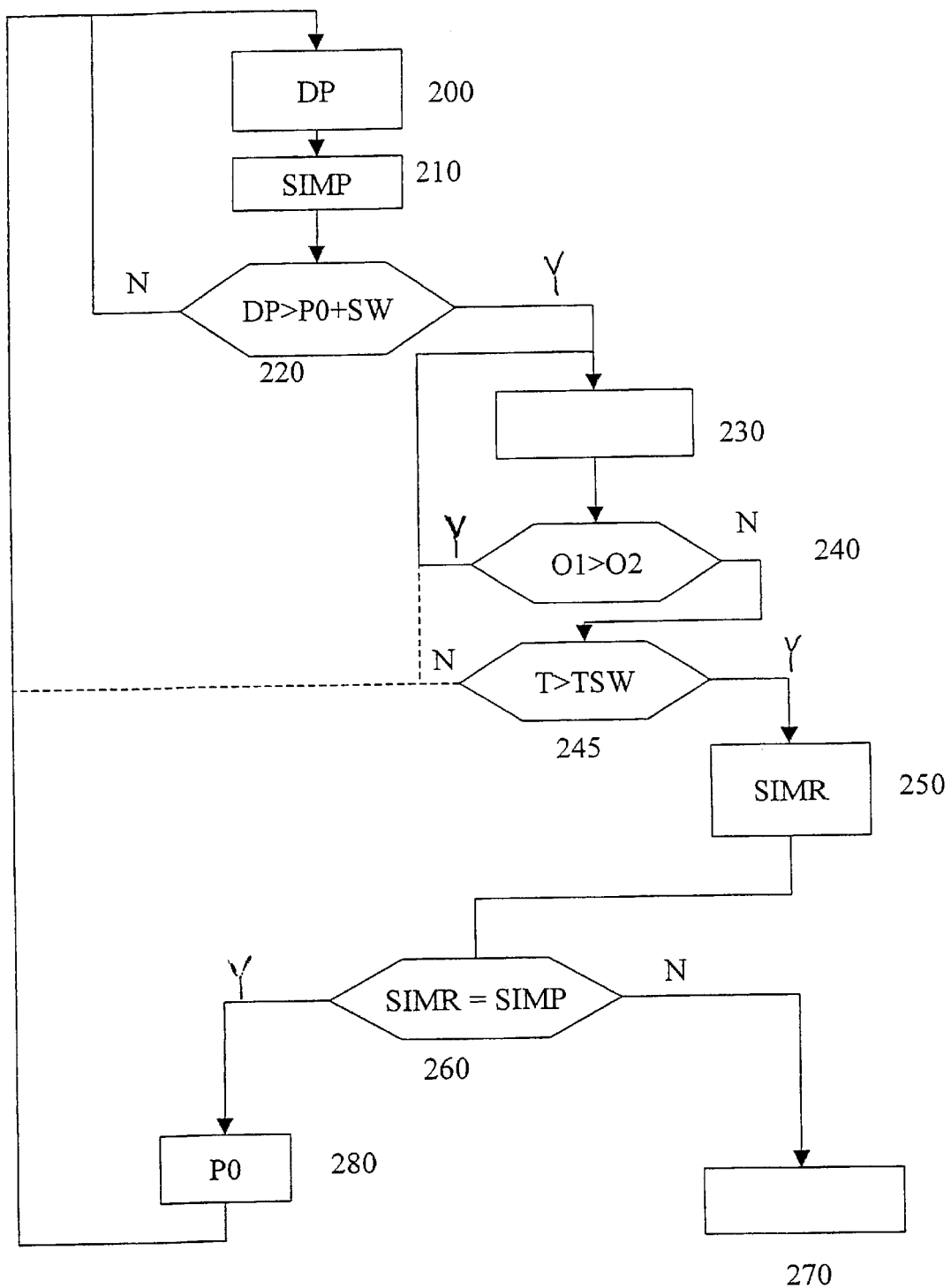
FIG. 2 is a flow diagram of an exemplary method according to the present invention.

Another exemplary method according to the present invention is described below with reference to the flow diagram of FIG. 2. In normal operation of the internal combustion engine, the exhaust gases from the internal combustion engine may include small amounts of particles under certain operating conditions. These particles may be absorbed by the particle filter, resulting in an increase in the flow resistance through the particle filter. The flow resistance creates a pressure difference between the inlet and the outlet of the particle filter, which is a measure of the loading of the particle filter.

First step 200 detects the pressure difference DP between the inlet and the outlet of the particle filter. The pressure difference is used as a state quantity characterizing the state of the exhaust gas aftertreatment system. In subsequent step 210, an input quantity SIMP is determined based on the state quantity characterizing the amount of substances supplied to the exhaust gas aftertreatment system. That is, input quantity SIMP corresponds to the amount of particles deposited in the particle filter.

Query 220 checks whether the pressure difference is greater than a cumulative value, which may correspond, for example, to the sum of a threshold value TV and an offset value PO. The value PO corresponds to the pressure difference in a completely generated particle filter.

If query 220 detects that pressure difference DP is greater than the sum of the threshold value and the offset value, step 230 initiates regeneration. If not, normal operation continues in step 200.

Instead of pressure difference DP, other quantities may be used to characterize the state of the exhaust gas aftertreatment system. For example, the load state may be simulated based on other characteristic operating quantities, such as the amount of fuel injected, the rotational speed, and other quantities.

During regeneration in step 230, suitable measures are performed, which result in an increase in the exhaust gas temperature. For example, post-injection may be performed, or the start, duration, or end of injection may be modified, or the injection profile may be modified, so that the exhaust gas temperature rises. Simultaneously, the signals from the sensors that detect a first oxygen concentration O1 upstream from the particle filter and a second oxygen concentration O2 downstream from the particle filter are evaluated in step 230. Furthermore, the exhaust gas temperature, for example, upstream from the particle filter, my be detected, or alternatively, exhaust gas temperature T may be determined in or downstream from the particle filter.

Query 240 checks whether the oxygen concentration upstream from the particle filter is greater than the oxygen concentration downstream from the particle filter. If so, this indicates that regeneration has not yet ended, and step 230 is repeated. If not, i.e., if the oxygen concentrations upstream and downstream from the particle filter are approximately the same, query 245 checks whether exhaust gas temperature T is greater than a threshold value TTV. If so, i.e., if the exhaust gas temperature T is high enough for regeneration and the oxygen concentrations upstream and downstream from the particle filter are approximately the same, regeneration is ended and step 250 is performed. If exhaust gas temperature T is less than threshold value TTV, step 230 or step 200 is continued, depending on which exemplary method according to the present invention is employed, both alternatives being indicated by dashed lines.

Step 250 determines the amount of particles oxidized during the regeneration process, based on first oxygen concentration O1 upstream from the particle filter and second oxygen concentration O2 downstream from the particle filter, which were present during the regeneration. This output quantity SIMR characterizes the amount of substances removed from the exhaust gas aftertreatment system during regeneration. The oxygen consumption my be determined, for example, from the difference between the first and the second oxygen concentrations. From this information, the amount of particles combusted may be determined and integrated over the entire regeneration process.

Subsequent query 260 checks whether input quantity SIMP and output quantity SIMR are approximately the same. If not, i.e., if there are more particles deposited in the particle filter than regenerated, or if there are fewer particles deposited than regenerated, a defect is presumed. In this case, errors in step 270 are detected. If both quantities are approximately the same, offset value PO is redefined in step 280, i.e., the new offset value corresponds to the pressure difference after complete regeneration.

It is believed that the exemplary embodiment according to the present invention described with reference to FIG. 2 advantageously permits individual elements to be omitted or supplemented with additional queries and steps. In one exemplary embodiment according to the present invention, only steps 200 through 240 performed, i.e., only the end of the regeneration is detected, based on the signals indicating the oxygen concentration.

In addition, it is also believed to be advantageous if the end of regeneration is detected through other quantities, and the oxygen concentration is used only for monitoring the exhaust gas aftertreatment system.

Query 220 causes the special operation, i.e., the regeneration, to be initiated when a state quantity characterizing the load state via the exhaust gas aftertreatment system exceeds a threshold value. The threshold value may be adapted by reestablishing the offset value PO of the threshold value at the end of regeneration, when the regeneration has been completely performed. Alternatively, a correction factor may be formed for correcting state quantity DP.

The flow resistance or the differential pressure exhibited by the particle filter after regeneration may be used as an output value to indicate an empty filter. Using this output value, the threshold value at which the regeneration is initiated and/or the quantity characterizing the load state may be recalibrated after every complete regeneration. Thus, various amounts of ash accumulation may be adapted for.

It is also believed to be advantageous if, during the special operation, i.e., during the regeneration based on the first quantity and the second quantity, which respectively characterize the oxygen concentration upstream and downstream from the particle filter, an output quantity is determined characterizing the amount of substances removed from the exhaust gas aftertreatment system, i.e., the amount of particles regenerated.

It is also believed to be advantageous if input quantity SIMP, which characterizes the amount of substances supplied to the exhaust gas aftertreatment system, is detected in step 210 and compared to output quantity SIMR in step 260, and errors are detected based on this comparison.

What is claimed is:

1. A method of controlling an exhaust gas aftertreatment system, the method comprising:
   intermittently performing a special operation; and
   controlling the special operation as a function of:
   a) a first quantity characterizing an oxygen concentration in an exhaust gas upstream from the exhaust gas aftertreatment system, and
   b) a second quantity characterizing an oxygen concentration in the exhaust gas downstream from the exhaust gas aftertreatment system; and
   performing a regeneration of a particle filter during the special operation, wherein a state quantity characterizes a load state of the particle filter.

2. The method according to claim 1, wherein the exhaust gas aftertreatment system is situated in an internal combustion engine.

3. The method according to claim 1, further comprising:
   completing the special operation if the first quantity is approximately the same as the second quantity.

4. The method according to claim 1, wherein the special operation is performed if another state quantity characterizing a state of the exhaust gas aftertreatment system exceeds a threshold value.

5. The method according to claim 4, wherein at least one of the state quantities and the threshold value is adapted.

6. The method according to claim 1, further comprising:
   determining an output quantity characterizing an amount of substances removed from the exhaust gas aftertreatment system based on the first quantity and the second quantity, the output quantity being determined during the special operation.

7. The method according to claim 6, further comprising:
   detecting whether an error exists based on a comparison between the output quantity and an input quantity characterizing an amount of substances supplied to the exhaust gas aftertreatment system.

8. The method according to claim 1, wherein the exhaust gas aftertreatment system is situated in an internal combustion engine, the method further comprising:
   completing the special operation if the first quantity is approximately the same as the second quantity.

9. The method according to claim 8, wherein the special operation is performed if another state quantity characterizing a state of the exhaust gas aftertreatment system exceeds a threshold value.

10. The method according to claim 9, wherein at least one of the state quantities and the threshold value is adapted.

11. The method according to claim 8, further comprising:
    determining an output quantity characterizing an amount of substances removed from the exhaust gas aftertreatment system based on the first quantity and the second quantity, the output quantity being determined during the special operation.

12. The method according to claim 8, further comprising:
   detecting whether an error exists based on a comparison between the output quantity and an input quantity characterizing an amount of substances supplied to the exhaust gas aftertreatment system.

13. The method according to claim 12, further comprising:
   detecting whether an error exists based on a comparison between the output quantity and an input quantity characterizing an amount of substances supplied to the exhaust gas aftertreatment system.

14. A device for controlling an exhaust gas aftertreatment system, the device comprising:
   an operations arrangement for intermittently performing a special operation;
   a controlling arrangement for controlling the special operation as a function of:
      a) a first quantity characterizing an oxygen concentration in an exhaust gas upstream from the exhaust gas aftertreatment system, and
      b) a second quantity characterizing an oxygen concentration in the exhaust gas downstream from the exhaust gas aftertreatment system; and
   performing a regeneration of a particle filter during the special operation, wherein a state quantity characterizes a load state of the particle filter.

15. The device according to claim 14, wherein the exhaust gas aftertreatment system is situated in an internal combustion engine.

16. The device according to claim 14, wherein the special operation is completed if the first quantity is approximately the same as the second quantity.

17. The device according to claim 16, wherein the special operation is performed if another state quantity characterizing a state of the exhaust gas aftertreatment system exceeds a threshold value.

18. The device according to claim 17, wherein at least one of the state quantities and the threshold value is adapted.

19. The device according to claim 14, further comprising:
   a determining arrangement to determine an output quantity characterizing an amount of substances removed from the exhaust gas aftertreatment system based on the first quantity and the second quantity, the output quantity being determined during the special operation.

20. The device according to claim 19, further comprising:
   a detecting arrangement to detect whether an error exists based on a comparison between the output quantity and an input quantity characterizing an amount of substances supplied to the exhaust gas aftertreatment system.

21. The device according to claim 14, further comprising:
   a detecting arrangement to detect whether an error exists based on a comparison between the output quantity and an input quantity characterizing an amount of substances supplied to the exhaust gas aftertreatment system.

* * * * *

UNITED STATES PATENT AND TRADEMARK OFFICE
CERTIFICATE OF CORRECTION

PATENT NO. : 6,722,120 B2
DATED : April 20, 2004
INVENTOR(S) : Holger Plote

It is certified that error appears in the above-identified patent and that said Letters Patent is hereby corrected as shown below:

Title page,
Item [57], ABSTRACT, change "A method and device…….aftertreatment system" to -- A method and device are provided for controlling an exhaust gas aftertreatment system, for example, an exhaust gas aftertreatment system of an internal combustion engine. A special operation is intermittently performed. The control and/or monitoring of the special operation is performed as a function of a first quantity characterizing the oxygen concentration in the exhaust gas upstream from the exhaust gas aftertreatment system, and a second quantity characterizing the oxygen concentration in the exhaust gas downstream from the exhaust gas aftertreatment system. --

Signed and Sealed this

Fifteenth Day of February, 2005

JON W. DUDAS
*Director of the United States Patent and Trademark Office*